Sept. 23, 1952 H. A. HADLEY 2,611,606
WEIGHING SCALE
Filed Jan. 6, 1947 3 Sheets-Sheet 1
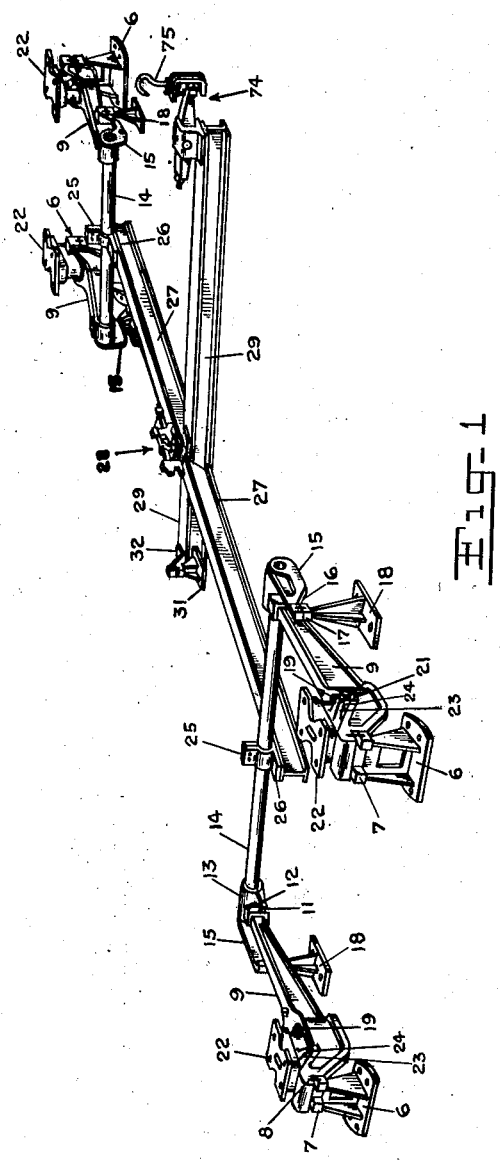
INVENTOR.
HARLAN A. HADLEY.
BY
ATTORNEY.

Sept. 23, 1952     H. A. HADLEY     2,611,606
WEIGHING SCALE
Filed Jan. 6, 1947     3 Sheets-Sheet 2
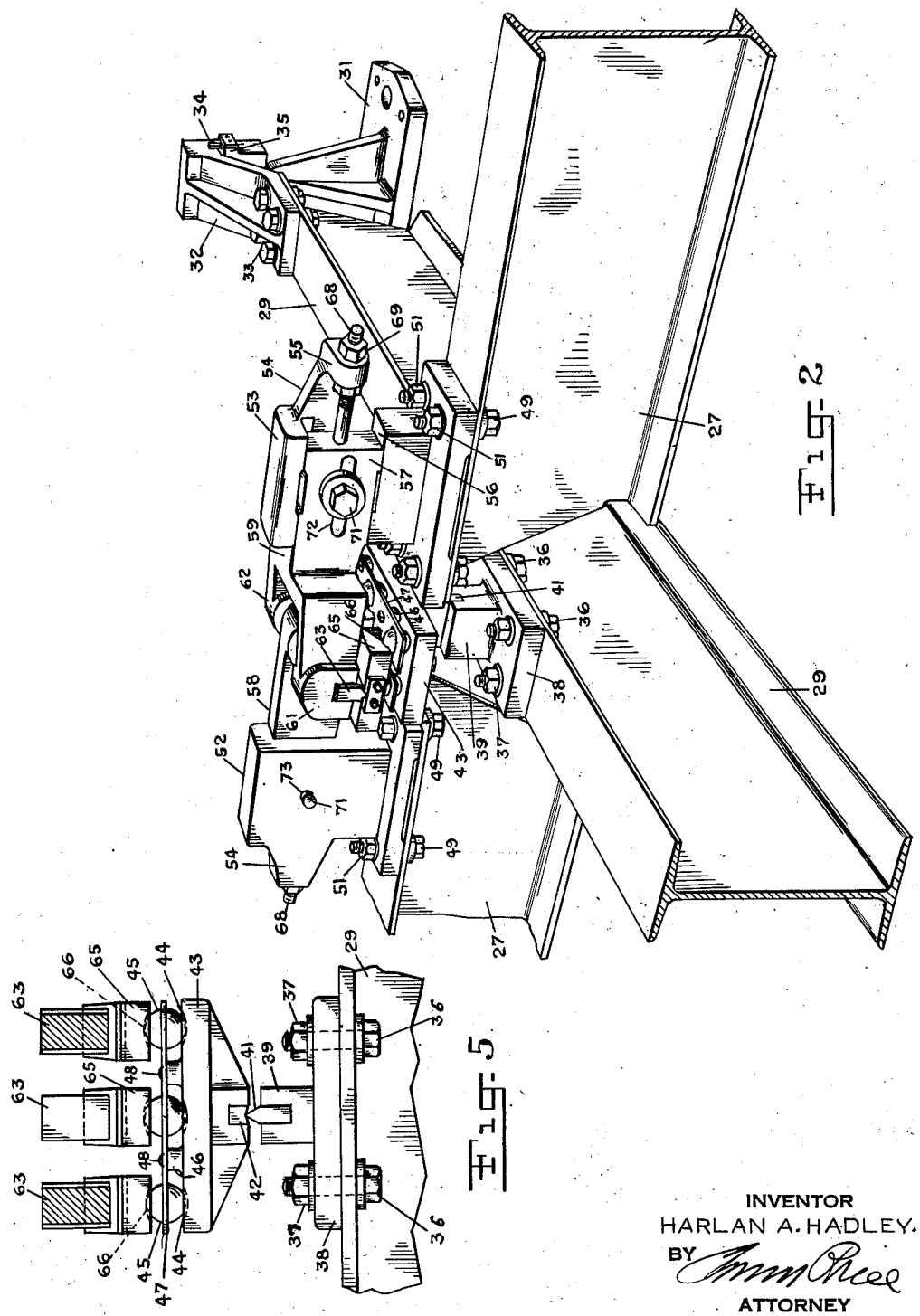
INVENTOR
HARLAN A. HADLEY.
BY
ATTORNEY

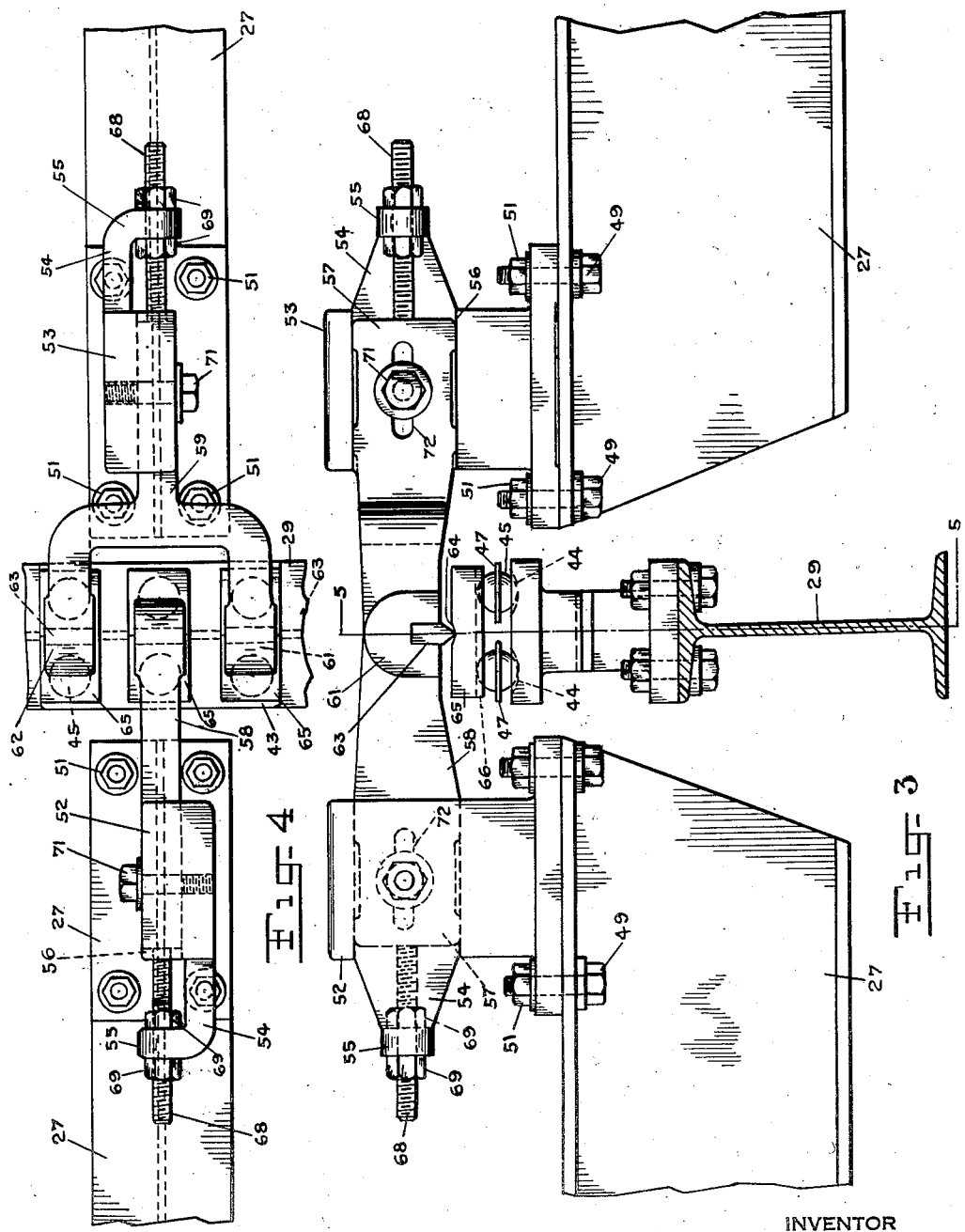

Patented Sept. 23, 1952

2,611,606

UNITED STATES PATENT OFFICE 2,611,606

WEIGHING SCALE

Harlan A. Hadley, Rutland, Vt., assignor to The Howe Scale Company, a corporation of Vermont Application January 6, 1947, Serial No. 720,443

17 Claims. (Cl. 265—71)

1

This invention relates to weighing scales, and relates more particularly to scales for weighing relatively heavy loads such as motor vehicles, railway cars and the like. In scales of the type referred to, it is important that the platform be so supported on the scale levers that it may have freedom of motion when a load is placed thereon, in order that excessive strain on the scale elements be avoided. It is also essential, in order that a correct weighing of the load be obtained, that the lever mechanism of the scale be maintained in alignment regardless of the movement of the scale platform.

It is an important object of this invention to provide in a scale an improved connection between the mains and the transverse lever which will permit the platform supported on the levers to move without producing torsional strain on the levers or excessive strain on the pivots and bearings.

Another object of this invention is the provision of a novel connection between the main arms and the transverse lever wherein the free ends of the main arms are freely movable relative to each other.

Still another object of this invention is the provision of a novel connection between the main arms and the transverse lever wherein the bearings and pivots are so mounted as to substantially eliminate friction.

Other objects of this invention, together with certain details of construction and combinations of parts, will be more particularly described in the specification and pointed out in the appended claims.

In the drawings wherein a preferred embodiment of my invention is shown,

Fig. 1 is a perspective view of a lever system embodying my novel connection between the main arms and the transverse lever;

Fig. 2 is an enlarged perspective view of my novel connection arrangement;

Fig. 3 is a front elevational view thereof;

Fig. 4 is a top plan view thereof; and

Fig. 5 is a cross-sectional view taken on line 5—5 in Fig. 3.

Like reference numerals indicate like parts throughout the several views of the drawings.

Referring to the drawings for a detailed description of my invention, the reference numeral 6 indicates main fulcrum stands each having seated thereon bearings 7 in which rest fulcrum pivots 8 fixed in the butt end of load receiving levers 9. The other ends of levers 9 are provided with pivots 11 which rest on bearings 12

2 carried in brackets 13 fixedly mounted on pipe levers 14. Each end of pipe lever 14 has fixed thereon a fulcrum bracket 15 in the free end of which is mounted a pivot 16 adapted to rest in a bearing 17 carried in the upper end of pipe level fulcrum stands 18.

Load receiving levers 9 are provided with openings 19 on the sides of which are seated pivots 21, only one of which is shown. The openings 19 in the levers 9 are adapted to receive suitable supports (not shown) for girder chairs 22 and have integral arms 23, only one of which is shown, having bearings 24 mounted therein which rest on said pivots 21.

Pipe levers 14 have fixed thereto clamps 25 each having an integral extension 26 which is attached in any suitable manner, as by welding or by bolts, to one end of main arms 27. These main arms are operatively connected by means of my novel connection, generally indicated by reference numeral 28, to a transverse lever 29. One end of this transverse lever is fulcrumed on fulcrum stand 31 by means of an offset bracket 32 attached to the transverse lever 29 by means of bolts 33. Bracket 32 has fixed therein a pivot 34 which is adapted to rest on bearing 35 carried at the top of fulcrum stand 31.

The construction of my novel connection between the main arms 27 and the transverse lever 29 will now be described. The transverse lever 29 has mounted thereon, as by means of screwbolts 36 and nuts 37, a bracket 38 having an integral boss 39 in which is fixed a pivot 41. Pivotally engaging pivot 41 is a bearing 42 which may be mounted in any suitable manner in saddle-block 43, so that the latter rocks on said pivot 41. The upper surface of saddle-block 43 is provided with a plurality of depressions 44 for the reception of spherical anti-friction bearings 45. Means are provided for holding the spherical bearings in position on the saddle-block, said means comprising bosses 46 which may be formed integral with the upper surface of saddle-block 43 and apertured plates 47 which may be attached to said bosses 46 by means of screws 48. The apertures in plates 47 are slightly larger in diameter than the diameter of spherical bearings 45, over which they are adapted to be placed, so that the bearings may rotate freely therein.

The main arms 27 have mounted thereon, as by means of screw-bolts 49 and nuts 51, brackets 52 and 53 substantially similar in construction. Each of said brackets 52 and 53 has an integral projection 54 provided with apertured boss 55, the purpose of which will be hereinafter described. Each of said brackets is cut away at 56 to form seats for the ends 57 of pivot arms 58 and 59. Pivot arm 59 is bifurcated to form fingers 61 and 62. In operative position pivot arm 58 supported in bracket 52 extends between the fingers 61 and 62 of pivot arm 59 supported in bracket 53.

The free end of pivot arm 58 and the free ends of fingers 61 and 62 have pivots, such as pivot 63. The pivots rest in lateral bearing groups 64 of bearing blocks 65, three bearing blocks being provided, one for each of the three pivots 63. The bearing blocks are also provided with a longitudinal and wider groove 66 which rests on two laterally aligned spherical bearings 45.

The operative length of the pivot arms 58 and 59 may be adjusted. To this end, the ends 57 of pivot arms 58 and 59 are provided with threaded rods 68 which extend through bosses 55. The pivot arms are held in adjusted position by means of lock nuts 69 and also by means of a screw-bolt 71 passing through a slot 72 in the ends of the pivot arms 58 and 59 and into threaded openings 73 in the brackets 52 and 53.

The tip end of extension lever 29 has mounted thereon an adjustable nose-iron arrangement, generally indicated by reference numeral 74 which is adapted to be connected to any suitable beam outfit (not shown) by means of a loop 75 connected to said nose-iron.

In the construction herein shown and described it will be seen that no excessive strain is placed on the scale elements when the usually heavy loads are run onto the platform. My novel connection between the main arms and the transverse lever effects the dissipation of a substantial proportion of the strain normally caused to be placed on the scale elements by the running of the loads onto the platform. At no time is the vertical alignment of the pivot elements of the connection between the main arms and the transverse lever disturbed by movement of the platform.

As many changes could be made in the above-described construction and many different embodiments of this invention could be made without departing from the scope thereof, it is intended that all matter contained in the above description or shown in the accompanying drawings shall be interpreted as illustrative and not in a limiting sense.

What I claim as new and desire to secure by Letters Patent is:

1. In a weighing scale, the combination with a lever system including a transverse lever and main arms, of a pivot supported on said transverse lever, pivots supported on said main arms, and means including anti-friction bearings and a plurality of bearing blocks resting on said anti-friction bearings for operatively connecting said pivots to support said main arms on said transverse lever.

2. In a weighing scale, the combination with a lever system including a transverse lever and main arms, of means for connecting said transverse lever and said main arms, comprising a pivot on said transverse lever, a saddle-block rockably supported on said pivot, pivots on said main arms, and means including anti-friction bearings and a plurality of bearing blocks resting on said anti-friction bearings for supporting said main arm pivots on said saddle-block.

3. In a weighing scale, the combination with a lever system including a transverse lever and main arms, of means for connecting said transverse lever and said main arms, comprising a pivot on said transverse lever, a saddle-block rockably supported on said pivot, pivots on said main arms, anti-friction bearings on said saddle-block and bearing blocks on said anti-friction bearings for supporting said main arm pivots.

4. In a weighing scale, the combination with a lever system including a transverse lever and main arms, of means for connecting said transverse lever and said main arms, comprising a pivot on said transverse lever, a saddle-block rockably supported on said pivot, pivots on said main arms, spherical bearings on said saddle-block, and bearing blocks each having a groove resting on said spherical bearings for supporting said main arm pivots.

5. In a weighing scale, the combination with a lever system including a transverse lever and main arms, of means for connecting said transverse lever and said main arms, comprising a pivot on said transverse lever, a saddle-block rockably supported on said pivot, a bracket on each of said main arms, arms carried by said brackets, pivots in said latter arms, and means including anti-friction bearings for supporting said latter pivots on said saddle-block.

6. In a weighing scale, the combination with a lever system including a transverse lever and main arms, of means for connecting said transverse lever and said main arms, comprising a pivot on said transverse lever, a saddle-block rockably supported on said pivot, a bracket on each of said main arms, arms carried by said brackets, means for adjusting said latter arms including an integral projection with an apertured boss on each of said brackets and a threaded adjustment rod passing through said boss, pivots in said latter arms, and means including anti-friction bearings for supporting said latter pivots on said saddle-block.

7. In a weighing scale, the combination with a lever system including a transverse lever and main arms, of means for connecting said transverse lever and said main arms, comprising a pivot in said transverse lever, a saddle-block rockably supported on said pivot, a bracket on each of said main arms, bracket arms carried by said brackets, means of adjusting said bracket arms, pivots in said bracket arms, spherical bearings on said saddle-block, and bearing blocks, each having a groove on the under surface thereof, supported on said spherical bearings, said bearing blocks supporting said latter pivots.

8. In a weighing scale, the combination with a lever system including a transverse lever and main arms, of means for connecting said transverse lever and said main arms, comprising a pivot in said transverse lever, a saddle-block rockably supported on said pivot, a bracket on each of said main arms, bracket arms carried by said brackets, means of adjusting said bracket arms, pivots in said bracket arms, spherical bearings on said saddle-block, and bearing blocks, each having a longitudinal groove on the under surface thereof, supported on said spherical bearings, said bearing blocks each having a lateral groove in the upper surface thereof in which said latter pivots are supported.

9. In a weighing scale, the combination with a lever system including a transverse lever and two main arms, of means for connecting said transverse lever and said main arms comprising a pivot supported on said transverse lever, a saddle-block rockably mounted on said pivot, anti-friction bearings mounted on said saddle-block, a bracket on each of said main arms, a bifurcated arm carried in one of said brackets, an arm carried by the other of said brackets and extending within the bifurcations of the bifurcated arm, and means for supporting said bracket support arms on said saddle-block including pivots on said bracket supported arms resting on bearing blocks supported by said anti-friction means.

10. In a weighing scale, the combination with a lever system including a transverse lever and two main arms, of means for connecting said transverse lever and said main arms comprising a pivot supported on said transverse lever, a saddle-block rockably mounted on said pivot, a bracket on each of said main arms, a bifurcated arm carried in one of said brackets, an arm carried by the other of said brackets and extending within the bifurcation of the arm, pivots in the bifurcated ends of said bifurcated arm, anti-friction bearings on said saddle-block, and bearing blocks on said anti-friction bearings for supporting said latter pivots.

11. In a weighing scale, the combination with a lever system including a transverse lever and two main arms, of means for connecting said transverse lever and said main arms comprising a pivot supported on said transverse lever, a saddle-block rockably mounted on said pivot, a bracket on each of said main arms, a bifurcated arm carried in one of said brackets, an arm carried by the other of said brackets and extending within the bifurcation of the arm, pivots in the bifurcated ends of said bifurcated arm, spherical bearings on said saddle-block, and bearing blocks, each having a groove resting on said spherical bearings, for supporting said latter pivots.

12. In a weighing scale, the combination with a lever system including a transverse lever and two main arms, of means for connecting said transverse lever and said main arms comprising a pivot supported on said transverse lever, a saddle-block rockably mounted on said pivot, a bracket on each of said main arms, a bifurcated arm carried in one of said brackets, an arm carried by the other of said brackets and extending within the bifurcation of the arm, pivots in the bifurcated ends of said bifurcated arm, spherical bearings, means for retaining said spherical bearings on said saddle-block, and bearing blocks, each having a longitudinal groove on the under surface thereof for engaging said spherical bearings on which said bearings are adapted to rest and a lateral groove in the upper surface thereof for supporting said latter pivots.

13. In a weighing scale, the combination with a lever system including a transverse lever and two main arms, of means for connecting said transverse lever and said main arms comprising a pivot supported on said transverse lever, a saddle-block rockably mounted on said pivot, anti-friction bearings mounted on said saddle-block, a bracket on each of said main arms, a bifurcated arm carried in one of said brackets, an arm carried by the other of said brackets and extending within the bifurcation of the arm, and means for supporting said bracket support arms on said saddle-block including pivots on said bracket supported arms resting on bearing blocks supported by said anti-friction means.

14. In a weighing scale, the combination with a lever system including a transverse lever and two main arms, of means for connecting said transverse lever and said main arms comprising a pivot supported on said transverse lever, a saddle-block rockably mounted on said pivot, a bracket on each of said main arms, a bifurcated arm carried in one of said brackets, an arm carried by the other of said brackets and extending within the bifurcation of the arm, pivots in the bifurcated ends of said bifurcated arm, spherical bearings, means for retaining said spherical bearings on said saddle-block, bearing blocks, each having a longitudinal groove on the under surface thereof for engaging said spherical bearings on which said bearings are adapted to rest and a lateral groove in the upper surface thereof for supporting said latter pivots, and means on said brackets for moving said bifurcated second-mentioned and third-mentioned arms relative to each other.

15. In a weighing scale, the combination with a lever system including a transverse lever and main arms, of a bracket mounted on said transverse lever, a pivot in said bracket, a saddle block, a bearing pivotally engaging said pivot mounted in said saddle block, anti-friction bearings on said saddle block, brackets mounted on said main arms, pivot arms mounted on said last-mentioned brackets, said pivot arms carrying pivots, and bearing blocks carried by said anti-friction bearings supporting said last-mentioned pivots.

16. The combination of claim 15, said pivot arms having threaded adjustment with respect to said last-mentioned brackets.

17. The combination of claim 15, the ends of one of said pivot arms being bifurcated to straddle the end of the other pivot arm.

HARLAN A. HADLEY.

REFERENCES CITED

The following references are of record in the file of this patent:

UNITED STATES PATENTS

| Number | Name | Date |
|---|---|---|
| 110,696 | Truex | Jan. 3, 1871 |
| 903,910 | Stimpson | Nov. 17, 1908 |
| 1,759,885 | Bousefield | June 11, 1928 |
| 1,894,009 | Starr | Jan. 10, 1933 |